(12) United States Patent
Conner et al.

(10) Patent No.: US 8,370,433 B2
(45) Date of Patent: Feb. 5, 2013

(54) SYSTEM AND METHOD FOR TRANSITIONING COMMUNICATIONS IN A CONFERENCING ENVIRONMENT

(75) Inventors: Forest M. Conner, Mountain View, CA (US); Purva Upasak, Madhya Pardesh (IN)

(73) Assignee: Cisco Technology, Inc., San Jose, CA (US)

( * ) Notice: Subject to any disclaimer, the term of this patent is extended or adjusted under 35 U.S.C. 154(b) by 826 days.

(21) Appl. No.: 12/508,867

(22) Filed: Jul. 24, 2009

(65) Prior Publication Data

US 2011/0022968 A1    Jan. 27, 2011

(51) Int. Cl.
  *G06F 15/16*    (2006.01)
(52) U.S. Cl. ........ 709/204; 709/205; 709/206; 709/207; 709/225
(58) Field of Classification Search .................. 709/204, 709/205, 206, 207, 225
  See application file for complete search history.

(56) References Cited

U.S. PATENT DOCUMENTS

| | | | |
|---|---|---|---|
| 6,288,740 B1 * | 9/2001 | Lai et al. ..................... | 348/14.09 |
| 7,353,251 B1 * | 4/2008 | Balakrishnan ................ | 709/204 |
| 2008/0231687 A1 * | 9/2008 | Baird et al. ................. | 348/14.09 |
| 2008/0273079 A1 * | 11/2008 | Campbell et al. .......... | 348/14.08 |
| 2011/0286583 A1 * | 11/2011 | Hultkrantz et al. ........ | 379/88.01 |
| 2012/0066355 A1 * | 3/2012 | Tiwari et al. ............... | 709/220 |

OTHER PUBLICATIONS

Cisco Systems, Inc., "Changing Call Handler Greetings through the TUI with Cisco Unity 4.0," Document ID: 40353, Copyright © 2006-2007; Updated Feb. 1, 2007; 7 pgs.

* cited by examiner

*Primary Examiner* — Liangche A Wang

(57) ABSTRACT

A method is provided in one example embodiment and includes evaluating calendar information in order to identify a first meeting involving an end user and a second meeting involving the end user. The meetings are configured to be provided consecutively in relation to each other and during a designated time period in which both meetings begin. The credential information can be used to enable participation in the first meeting by the end user. The method also includes transitioning the end user from the first meeting to the second meeting without requiring additional credential information to enable participation in the second meeting. In other embodiments, the method includes prompting the end user with information about the second meeting before transitioning the end user from the first meeting to the second meeting. In still other embodiments, the method includes maintaining shared information generated in the first meeting such that the shared information is provided to the end user in the second meeting.

20 Claims, 3 Drawing Sheets

SYSTEM AND METHOD FOR TRANSITIONING COMMUNICATIONS IN A CONFERENCING ENVIRONMENT

TECHNICAL FIELD

This disclosure relates in general to the field of communications and, more particularly, to transitioning communications in a conferencing environment.

BACKGROUND

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies that exist in the current marketplace. As new communication platforms become available to the consumer, new protocols should be developed in order to optimize this emerging technology. Some issues have arisen in conferencing scenarios in which end users have multiple meetings to attend.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

OVERVIEW

A method is provided in one example embodiment and includes evaluating calendar information in order to identify a first meeting involving an end user and a second meeting involving the end user. The meetings are configured to be provided consecutively in relation to each other and during a designated time period in which both meetings begin. The credential information can be used to enable participation in the first meeting by the end user. The method also includes transitioning the end user from the first meeting to the second meeting without requiring additional credential information to enable participation in the second meeting. In other embodiments, the method includes prompting the end user with information about the second meeting before transitioning the end user from the first meeting to the second meeting. In still other embodiments, the method includes maintaining shared information generated in the first meeting such that the shared information is provided to the end user in the second meeting.

DETAILED DESCRIPTION OF EXAMPLE EMBODIMENTS

Figure 1:
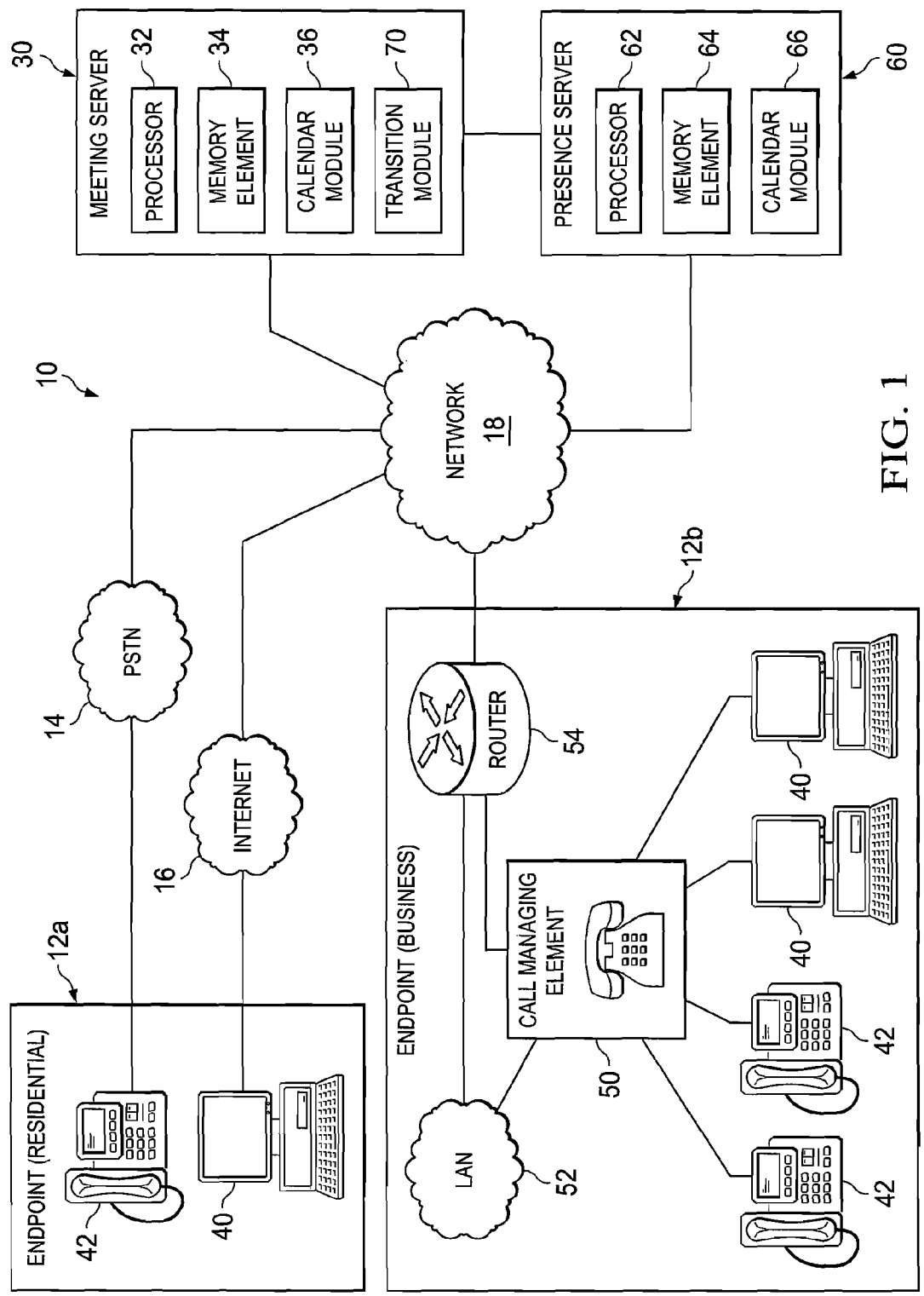
FIG. 1 is a simplified block diagram of a communication system for transitioning communications in accordance with one embodiment.

FIG. 1 is a simplified block diagram illustrating a communication system 10 for conducting a conference in accordance with one example embodiment. The conference could involve an accompanying video application, or the conference could simply be a voice call between various participants. FIG. 1 includes multiple endpoints 12a-b associated with various participants of a conference. FIG. 1 also includes a public switched telephone network (PSTN) 14, an Internet 16, a network 18, a meeting server 30, and a presence server 60.

Endpoint 12a represents a residential node, which in this instance includes a computer 40 and a telephone 42. Telephone 42 may be an Internet protocol (IP) telephone or a standard telephone that is operable to participate in a telephone conference (e.g., using dial-in information, a meeting ID, etc.). In certain examples, endpoint 12a can interface with computer 40 such that one or more capabilities of a session initial protocol (SIP) are enabled through telephone 42. Endpoint 12b is associated with a business entity that can include a connection to a local area network (LAN) 52, a router 54, several computers 40, and several telephones 42. In this instance, endpoint 12b also includes a coupling to a call managing element 50, which is configured to coordinate calls for this particular node. Call managing element 50 can also interact with computers 40 and telephones 42 to enhance, or otherwise manage, conference calls. These calls may involve network communications and/or video applications in which participants are empowered to share information amongst each other, as further detailed below. Each endpoint 12a-b can be configured to interface with meeting server 30 and presence server 60, which help to coordinate and to process events and information being transmitted by the participants of a conference.

Note that before turning to the example flows and infrastructure of example embodiments of the present disclosure, a brief overview of the conferencing architecture is provided. The components of the conferencing architecture of FIG. 1 can use technologies in conjunction with specialized applications and hardware to create a solution that can leverage the network. This conferencing architecture can use IP technology and operate on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all participants can be provided. Participants can use their end-user devices to access data for meetings, join a Meeting Place application, a WebEx session, a simple web session, and possibly stay connected to other applications throughout their meetings.

Endpoints 12a-b can be associated with clients or customers wishing to participate in a conference in communication system 10. The term 'endpoint' may be inclusive of devices used to initiate a communication, such as a switch, a console, a proprietary endpoint, a telephone, an IP phone, an iPhone, a cellular telephone, a bridge, a computer, a personal digital assistant (PDA), a laptop or an electronic notebook, or any other device, component, element, or object capable of initiating voice, audio, or data exchanges within communication system 10.

Endpoints 12a-b may also be inclusive of a suitable interface to the human user, such as a microphone, a display, or a keyboard or other terminal equipment. Endpoints 12a-b may also include any device that seeks to initiate a communication on behalf of another entity or element, such as a program, a database, or any other component, device, element, or object capable of initiating a voice, a video, video, or a data exchange within communication system 10. Data, as used herein in this document, refers to any type of video, numeric, voice, or script data, or any type of source or object code, or any other suitable information in any appropriate format that may be communicated from one point to another.

Network 18 represents a series of points or nodes of interconnected communication paths for receiving and transmitting packets of information that propagate through communication system 10. Network 18 offers a communicative interface between servers (and/or endpoints) and may be any local area network (LAN), a wireless LAN (WLAN), a metropolitan area network (MAN), a virtual LAN (VLAN), a virtual private network (VPN), a wide area network (WAN), or any other appropriate architecture or system that facilitates communications in a network environment. Network 18 can implement a transmission control protocol (TCP)/Internet Protocol (IP) communication language protocol in a particular embodiment of the present disclosure; however, network 18 may alternatively implement any other suitable communication protocol for transmitting and receiving data packets within communication system 10. Note also that network 18 can accommodate any number of ancillary activities, which can accompany a video conference. For example, this network connectivity can facilitate all informational exchanges (e.g., virtual white boards, PowerPoint presentations, e-mailing, texting, word processing applications, etc.).

Meeting server 30 may include a processor 32, a memory element 34, a calendar module 36, and a transition module 70. Meeting server 30 may be configured to receive information from one or more participants employing an endpoint to set up (or otherwise participate in) a conference with other participants. For example, scheduling, calendaring, sharing applications, web applications, etc. may be coordinated with the assistance of meeting server 30. Additionally, any user IDs, meeting IDs, passwords, data associated with authentication procedures, security keys, data associated with authorization protocols, etc. may be validated, stored, and/or otherwise processed within meeting server 30 (potentially operating in conjunction with presence server 60). All of these items are generally referred to as 'credential information' as used herein in this Specification. Thus, meeting server 30 can readily validate end-user information, and receive/send registrations, invitations to sessions, reminders, and other requests for one or more interested endpoints. Some or all of these activities may be completed by accessing other elements such as calendar modules 36, 66.

In one example implementation, meeting server 30 can be a Session Initiation Protocol (SIP) protocol that provides voice, video, and/or web conferencing solutions to one or more endpoints 12*a-b*. In such a context, SIP can operate as an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which can support personal mobility. End users can maintain a single externally visible identifier regardless of their network location. Meeting server 30 may support deployments for combined video and audio support (which may be provided together in certain embodiments). Meeting server 30 can incorporate media-rich interactions into a broad range of communication scenarios. Meeting server 30 can also be integrated with WebEx Web conferencing protocols. In certain implementations, meeting server 30 does not use SIP and instead coordinates meetings without employing the use of such technology.

In some instances, meeting server 30 may include applications that require the creation and management of a session, where a session is considered an exchange of data between participants. The implementation of these applications is complicated by the practices of participants: users may move between endpoints, they may be addressable by multiple names, and they may communicate in several different media. Meeting server 30 can accommodate these scenarios and protocols that carry various forms of real-time multimedia session data such as voice, video, or text messages. Meeting server 30 can also offer a general-purpose tool for creating, modifying, and/or terminating sessions.

Presence server 60 similarly includes a processor 62, a memory element 64, and a calendar module 66. Presence server 60 can collect information from multiple sources about user availability and communications capabilities to provide presence status and, further, facilitate presence-enabled communications with various applications. Operating in conjunction with SIP in one example implementation, presence server 60 can support numerous facets of establishing and terminating multimedia communications such as: 1) user location: determination of the end system to be used for communications; 2) user availability: determination of the willingness of the called party to engage in communications; 3) user capabilities: determination of the media and media parameters to be used; 4) session setup: "ringing" establishment of session parameters at both called and calling party locations; and 5) session management: including the transfer and termination of sessions, modifying session parameters, and invoking services.

Any entity or individual associated with an endpoint can be associated with an aggregation of presence data, which can represent the various devices and/or logical addresses that can be used by a person to communicate with another individual. For example, the presence data of an employee named Penelope could be represented by her business phone number, her cell phone number, her fully qualified domain name, her e-mail address, her scheduling/calendar commitments, and/or the IP address port of her Instant Messaging application on her personal computer. Any number of these variables (or others) could be used to reflect Penelope's presence data. Utilizing this presence data, presence server 60 can offer the ability for an endpoint to participate in a conference using several types of communication modes (i.e. telephone, e-mail, videophone, Instant Messaging, etc.). In one example, the presence data can be stored in memory element 64.

In one example implementation, meeting server 30 and presence server 60 can synchronize some of their information in order to better accommodate the scheduling of their associated end users. For example, calendar entries, device preferences, scheduling and reminders, and various other parameters may be exchanged by these two servers. In addition, both servers may utilize a directory in order to manage (or otherwise coordinate) the activities and communications of their end users. In one example, the directory may include a listing of end user names, login IDs, screen names, and various other characteristics that help identify the end users. In another example scenario, meeting server 30 and/or presence server 60 incorporate calendar information (inclusive of meetings) such that a coordinated prompting mechanism can be sent to an end user as his new meetings are approaching. In this sense, meeting server 30 and/or presence server 60 can identify preferred devices, preferred modes of communications, etc. along with the end user's upcoming activities. Additional operational capabilities of communication system 10 are detailed below with respect to FIGS. 2-3.

Figure 2:
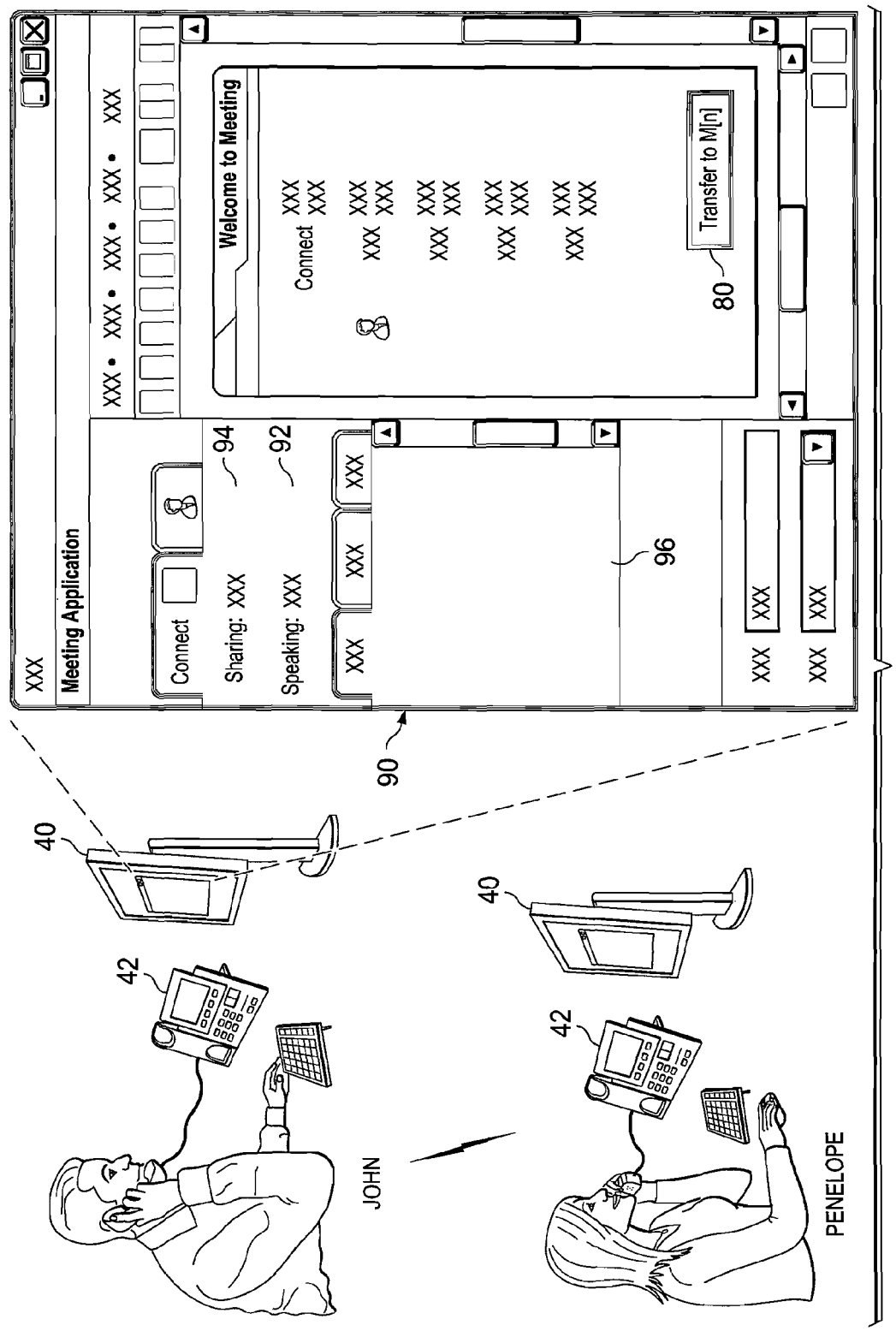
FIG. 2 is a simplified schematic diagram of a communication system for transitioning communications in accordance with one embodiment.

Turning to FIG. 2, FIG. 2 is a simplified schematic diagram depicting an example scenario involving two participants: Penelope and John. In this instance, these participants are using IP telephones 42 to participate in a phone conference. Also provided in this FIGURE is a screen shot of a meeting application 90, which further includes a sharing element 94, a speaking element 92, a participant list (or roster) 96, and a transfer element 80, which identifies a potential meeting for transition (e.g., transfer to M(n), where 'M' connotes 'meeting' and 'n' connotes the meeting number or meeting ID).

Before turning to the nuances of this particular scenario, it is noted that the objective of this scenario is to allow a meeting attendee (e.g., John) to move seamlessly from one meeting to another when two meetings are scheduled consecutively (e.g., adjacent, back to back, within a given time period, etc.). As used herein in this Specification, the term 'consecutively' encompasses all of these items, as well as meeting intervals (between individual meetings) that can range for multiple hours such that, even though two meetings might be spaced apart by several hours, an end user would not be required to reenter credential information as the subsequent meeting begins. Typically, when a participant has to attend multiple meetings, each meeting obligates the participant to dial into a platform (e.g., enter information to be received by meeting server 30) and, in some instances, log in to a meeting application to view the shared elements for these meetings. This shared information could include white board materials, PDFs, PowerPoint presentations, Word Documents, Excel Spreadsheets, video sharing, and various other items sought to be exchanged by participants in a conference environment.

In this particular example, John has a first meeting (Meeting #1), which is scheduled from 10:00 AM to 11:00 AM. John also seeks to attend a meeting immediately after Meeting #1. The second meeting (Meeting #2) is scheduled from 11:00 AM to 12:00 PM. In this example, John has dialed in to Meeting #1 such that he has a session connection with meeting server 30. John is also logged into an application in which he can share data/information during Meeting #1. This application could be resident in meeting server 30. With the session having been established, John can potentially hear the meeting audio, receive video data, and see the information being shared with the meeting attendees.

As Meeting #1 concludes, John understands that he must quickly move to his second commitment. In this example, John receives an Outlook Reminder indicating that the upcoming meeting will soon start. Without the mechanisms outlined herein, John would have to log out of Meeting #1, disconnect the voice call, and then setup a new session for Meeting #2. This is unnecessarily burdensome and, further, it can cause participants to be late for their meetings, which may further cause delays for all participants involved. Example embodiments presented herein can address this issue (and others) in providing a way to transition between Meeting #1 and Meeting #2 seamlessly.

Returning to the scenario of FIG. 2, John is using a meeting application for Meeting #1. John's credential information has already been verified or otherwise validated for Meeting #1. It is cumbersome to force an end user to systematically log in to a platform on which he is currently participating for the purpose of attending a new meeting on the same platform. Furthermore, if the end user has shared information, or if the end user has formulated work during the first meeting, it seems wasteful to reestablish his connection with meeting server 30 with the intent of simply maintaining this work. If John had generated work from the previous meeting, he would have to save that work, log out of the system, log back into the system, and then repost/repopulate this work in the shared space. As a separate matter, even an attempt to log in to a second meeting may spawn an error message that the profile is still in use and, therefore, the second session request might be denied.

In a certain example, meeting server 30 can improve the usability of a given meeting application to address this issue. Meeting server 30 has data indicating that John is logged into the application and, further, meeting server 30 has access to John's profile. In one example, John's profile information is accessed through presence server 60. Furthermore, John's calendar obligations may be accessed via calendar module 36. Based on this data, meeting server 30 can allow John to transition between meetings without having to break the first connection and, subsequently, recreate the second connection with separate credentials (e.g., log in data potentially inclusive of meeting ID information for a subsequent meeting). Such a transitioning capability increases usability for the end user and, further, reduces needless overhead. Additional details relating to these activities are described below with reference to FIG. 3.

Figure 3:
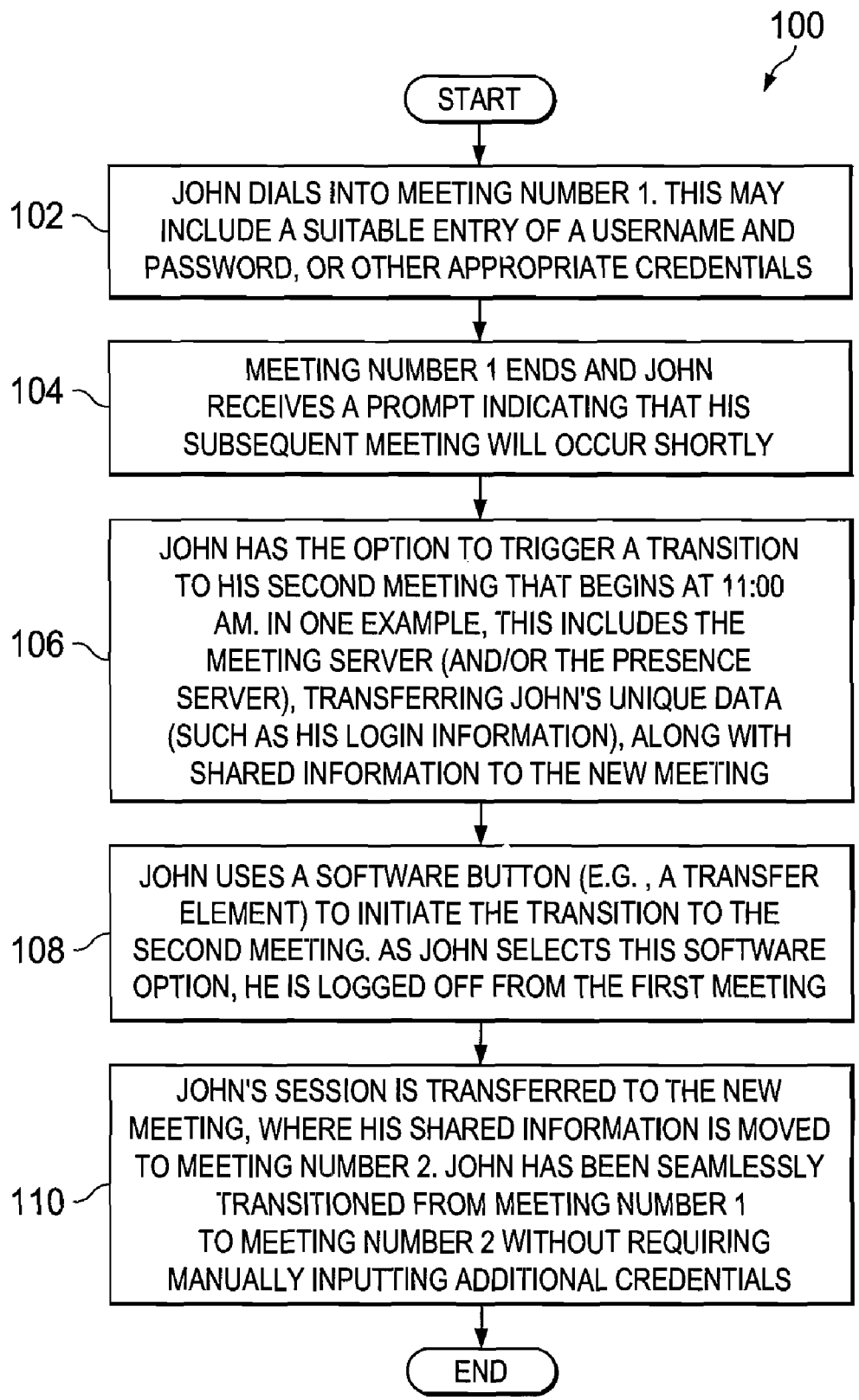
FIG. 3 is a simplified flowchart illustrating a series of example steps associated with the communication system.

FIG. 3 is a simplified flowchart illustrating one example scenario 100 involving an end user, who is participating in consecutive meetings in the course of his day. In this example, the end user John is logged into some sort of video conferencing application (e.g., John is logged into a Meeting Place protocol, a WebEx application, etc.). In this instance, John has a meeting (Meeting #1) from 10:00 AM to 11:00 AM. A second meeting (Meeting #2) is scheduled from 11:00 AM to 12:00 PM. Both of the meetings can have unique identifiers that distinguish them for the end users.

At step 102, John dials into Meeting #1. This may include a suitable entry of a username and password, or other appropriate login information (i.e., credential information). At step 104, Meeting #1 winds down, and John receives a prompt indicating that his subsequent meeting is about to take place. This prompting mechanism may be configured to occur at any suitable time interval, or there could be a default time characteristic provided, such as five minutes prior to a subsequent meeting beginning. In yet another example, the prompting mechanism is provided by a calendar function, which may be offered through an Outlook platform, a handheld device, calendar module 36, calendar module 66, or any other suitable tracking mechanism that can be used to alert an end user of an impending meeting.

This prompting mechanism could be as simple as a warning that alerts an end user of the current time. The prompting mechanism may also include an identification of the upcoming meeting and its participants. In other examples, the prompting mechanism includes a trigger (e.g., a software graphic shown to the end user) that can be selected for saving the current session, transferring out of the current session, deleting the current session, ignoring the prompt (either permanently or for some configurable time interval), or transitioning to the upcoming meeting that is identified by the prompting mechanism. In another instance, the prompting mechanism lists all meetings for a given day for the end user to evaluate.

The user, upon receiving such a notification, can elect to switch to the next meeting, or the end user may decline switching at that particular time. In certain implementations, the switch occurs autonomously such that once a first meeting ends, the end user would be sent directly to the subsequent meeting. This default mechanism may be configured by the end user, or the end user can forgo such defaulting protocols such that his volition acts as the trigger for joining upcoming meetings. In still other examples, an end user may configure preferences (e.g., preferred devices, preferred switching mechanisms, etc.) such that transitioning between meetings is conducted based on the preferences.

In this instance, the prompting mechanism is used to ask John if he would like to transition to the next meeting. Meeting server 30 effectively maintains an accurate timeline of events for each particular end user (or groups of end users). In one example implementation, a daemon can run in the background of meetings and, when appropriate, signal to a particular end user that an upcoming meeting will occur shortly.

At step 106, John has the option to trigger a transition to his second meeting that begins at 11:00 AM. In one example, this includes meeting server 30 (and/or presence server 60), transferring John's unique data (e.g., his login information), along with shared information to the new meeting. Thus, after the initial meeting ends at 11:00 AM, rather than having to disconnect and dial into meeting server 30 again, John is given the option to switch/to move his current session to Meeting #2.

One option provided to John to trigger the transition to the second meeting could be provided on a display (for example, on a Meeting Place screen), where a software button (e.g., a suitable graphic) is available to switch the end user between meetings. In other instances, such a trigger could be provided as a software application such that a given prompt may be responded to by selecting (e.g., via clicking a mouse) a given option on a computer screen.

At step 108, John uses a software button (e.g., transfer element 80) to initiate the transition to the second meeting. This transfer element 80 can be part of transition module 70, which in one example represents an application running on meeting server 30. As John selects this software option, he is effectively logged off from the first meeting. In one example, a simple transfer capability provided by transfer module 70 may be leveraged in order to switch an end user from the first meeting to the second meeting. In other example, this could occur as an end user receives a second call while on a first call. If the user chooses to accept the second call, the first call could be placed on hold. Once placed on hold, the end user is empowered to drop that first call and simply continue along with the second call. This represents another viable mechanism for transitioning between meetings.

At step 110, John's phone call is transferred to the new meeting, where his shared information is moved to Meeting #2. In this sense, John has seamlessly transitioned from Meeting #1 to Meeting #2 without having to remember long strings of identification numbers, additional passwords, authentication protocols, etc. Hence, in one example implementation, one or more servers can be used to connect two sessions that would otherwise be discreet sessions requiring the manual input of new login and new password information. In another example, a persistent login protocol is used for a configurable time period. For example, the convenience of not having to re-input credentials into the system could be provided as a timeout mechanism. If a user had ten different meetings that day (at various times), then he could theoretically attend all the meetings using a single set of credentials, which would only be required a first time (and not subsequently for the other nine meetings). Thus, the end user would only be burdened with this login chore one time, provided that he was within the configurable time interval before attending a subsequent meeting. If the time period lapsed, meeting server 30 could still be invoked to obviate the re-input of credential information in certain instances.

Software for transitioning between meetings (e.g., sessions) can be can be provided at various locations. In one example implementation, this software is resident in a server, such as meeting server 30, presence server 60, or another server for which this transitioning capability is relegated. In other examples, this could involve a proprietary element, which could be provided in (or be proximate to) these identified servers, or be provided in any other device being used by a given end user in a conferencing scenario, or be provisioned somewhere else in the network. The meeting recognition software can identify the meeting obligations of a participant. Based on this information, a seamless transition between meetings can be executed, while maintaining shared information associated with the previous meeting.

As used herein in this Specification, the term 'server' is meant to encompass routers, switches, bridges, gateway, processors, loadbalancers, firewalls, or any other suitable device, component, element, or object operable to exchange or process information in a network environment. Moreover, these servers may include any suitable hardware, software, components, modules, interfaces, or objects that facilitate the operations thereof. This may be inclusive of appropriate algorithms and communication protocols that allow for the effective exchange of data or information. Meeting server 30 and presence server 60 can be consolidated in any suitable manner. Along similar design alternatives, any of the internal modules and components of these servers may be combined in various possible configurations. It should also be noted that as used herein in this Specification, the term 'meeting' is meant to connote any session, call, conference, or communications connection in which an end user is interacting with another end user (in certain instances, over a network). In addition, as used herein in this Specification, the term 'calendar information' is meant to connote any information relating to timing, scheduling, or coordination of such meetings or other activities involving end users.

In other embodiments, the transitioning feature may be provided external to the servers, or included in some other network device, or in a computer (e.g., a personal computer) to achieve these intended functionalities. Alternatively, both of these elements (the personal computer and the server) can include this software (or reciprocating software) that can coordinate in order to achieve the transitioning operations outlined herein. In still other embodiments, one, two, or all of these devices may include any suitable algorithms, hardware, software, components, modules, interfaces, or objects that facilitate the operations thereof.

As identified previously, a server can include software to achieve the transitioning operations, as outlined herein in this document. Additionally, endpoints 12*a* and 12*b* may include some software (e.g., reciprocating software or software that assists in the transitioning activities, etc.) to help coordinate the meeting activities explained herein. In other embodiments, this feature may be provided external to these devices or included in some other device to achieve this intended functionality. Alternatively, both the servers and the peer endpoints include this software (or reciprocating software) that can coordinate in order to achieve the operations, as outlined herein.

In certain example implementations, the transitioning functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 1) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the servers, the endpoints, etc.) can include memory elements for storing information to be used in achieving the transitioning operations as outlined herein. Additionally, each of these devices may include a processor that can execute software or an algorithm to perform the transitioning activities as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided herein, interaction may be described in terms of two, three, four, or more network elements. However, this has been done for purposes of clarity and example only. In certain cases, it may be easier to describe one or more of the functionalities of a given set of flows by only referencing a limited number of components or network elements. It should be appreciated that communication system 10 of FIG. 1 (and its teachings) are readily scalable. Communication system 10 can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts.

What is claimed is:

1. A method, comprising:
   evaluating, via at least one processor, calendar information in order to identify a first meeting involving an end user and a second meeting involving the end user, wherein the meetings are configured to be provided consecutively in relation to each other and during a designated time period in which both meetings begin, and wherein credential information associated with the end user is operable to enable participation in the first meeting; and
   transitioning, via the at least one processor, the end user from the first meeting to the second meeting without requiring additional credential information to enable participation in the second meeting.

2. The method of claim 1, further comprising:
   prompting the end user with information about the second meeting before transitioning the end user from the first meeting to the second meeting.

3. The method of claim 1, further comprising:
   maintaining shared information generated in the first meeting such that the shared information is provided to the end user in the second meeting.

4. The method of claim 1, wherein the second meeting includes audio and video data being exchanged between participants of the second meeting.

5. The method of claim 1, wherein the transitioning includes initiating a call to the end user for the second meeting, and wherein electing to accept the call triggers the transitioning from the first meeting to the second meeting.

6. The method of claim 1, further comprising:
   interfacing with a server in order to access the calendar information.

7. The method of claim 1, further comprising:
   providing a software option, which is operable to be selected to initiate the transitioning from the first meeting to the second meeting.

8. One or more computer readable storage devices encoded with software comprising logic and when the logic is executed operable to:
   evaluate calendar information in order to identify a first meeting involving an end user and a second meeting involving the end user, wherein the meetings are configured to be provided consecutively in relation to each other and during a designated time period in which both meetings begin, and wherein credential information associated with the end user is operable to enable participation in the first meeting; and
   transition the end user from the first meeting to the second meeting without requiring additional credential information to enable participation in the second meeting.

9. The one or more computer readable storage devices of claim 8, the logic being further operable to:
   prompt the end user with information about the second meeting before transitioning the end user from the first meeting to the second meeting.

10. The one or more computer readable storage devices of claim 8, the logic being further operable to:
    maintain shared information generated in the first meeting such that the shared information is provided to the end user in the second meeting.

11. The one or more computer readable storage devices of claim 8, the logic being further operable to:
    facilitate audio and video data exchanges between participants of the second meeting.

12. The one or more computer readable storage devices of claim 8, wherein the logic for the transition includes logic to initiate a call to the end user for the second meeting, and wherein an election to accept the call triggers the transition from the first meeting to the second meeting.

13. The one or more computer readable storage devices of claim 8, the logic being further operable to:
   interface with a server in order to access the calendar information.

14. The one or more computer readable storage devices of claim 8, the logic being further operable to:
   provide a graphical option to the end user, the graphical option operable to be selected to initiate the transition from the first meeting to the second meeting.

15. An apparatus, comprising:
   a memory element configured to store data;
   a processor operable to execute instructions associated with the data; and
   a transition module configured to interface with the memory element and the processor, the transition module being configured to:
      evaluate calendar information in order to identify a first meeting involving an end user and a second meeting involving the end user, wherein the meetings are configured to be provided consecutively in relation to each other and during a designated time period in which both meetings begin, and wherein credential information associated with the end user is operable to enable participation in the first meeting; and
      transition the end user from the first meeting to the second meeting without requiring additional credential information to enable participation in the second meeting.

16. The apparatus of claim 15, wherein the transition module is part of a meeting server further configured to:
   prompt the end user with information about the second meeting before transitioning the end user from the first meeting to the second meeting.

17. The apparatus of claim 16, wherein the meeting server is further configured to:
   maintain shared information generated in the first meeting such that the shared information is provided to the end user in the second meeting.

18. The apparatus of claim 16, wherein the meeting server is further configured to:
   facilitate audio and video data being exchanged between participants of the second meeting.

19. The apparatus of claim 15, wherein the transition module is further configured to:
   initiate a call to the end user for the second meeting, and wherein electing to accept the call triggers the transitioning from the first meeting to the second meeting.

20. The apparatus of claim 15, further comprising:
   a calendar module operable to maintain the calendar information, which is configured to be accessed by a meeting server.

* * * * *

UNITED STATES PATENT AND TRADEMARK OFFICE
CERTIFICATE OF CORRECTION

| | | |
|---|---|---|
| PATENT NO. | : 8,370,433 B2 | |
| APPLICATION NO. | : 12/508867 | |
| DATED | : February 5, 2013 | |
| INVENTOR(S) | : Forest M. Conner | |

It is certified that error appears in the above-identified patent and that said Letters Patent is hereby corrected as shown below:

On the Title Page:

Item (75) Inventors: under the second inventor's city, replace "Madhya Pardesh (IN)" with -- Madhya Pradesh (IN) --.

Signed and Sealed this
Seventh Day of May, 2013

Teresa Stanek Rea
*Acting Director of the United States Patent and Trademark Office*